United States Patent
Shin et al.

(10) Patent No.: US 9,500,478 B2
(45) Date of Patent: Nov. 22, 2016

(54) METHOD AND APPARATUS FOR MEASURING ALTITUDE IN PORTABLE TERMINAL

(71) Applicant: Samsung Electronics Co. Ltd., Suwon-si, Gyeonggi-do (KR)

(72) Inventors: Gyejoong Shin, Suwon-si (KR); Dohyoung Chung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 792 days.

(21) Appl. No.: 13/908,594

(22) Filed: Jun. 3, 2013

(65) Prior Publication Data

US 2013/0325385 A1 Dec. 5, 2013

(30) Foreign Application Priority Data

Jun. 5, 2012 (KR) .................. 10-2012-0060418

(51) Int. Cl.
  *G01V 5/06* (2006.01)
  *G01C 5/06* (2006.01)
  *G01C 21/20* (2006.01)

(52) U.S. Cl.
  CPC .............. *G01C 5/06* (2013.01); *G01C 21/206* (2013.01)

(58) Field of Classification Search
  CPC combination set(s) only.
  See application file for complete search history.

(56) References Cited

U.S. PATENT DOCUMENTS

| | | | |
|---|---|---|---|
| 7,751,949 B2* | 7/2010 | Alanen et al. | 701/4 |
| 9,291,718 B2* | 3/2016 | Miyake | G01S 19/48 |
| 2009/0286556 A1* | 11/2009 | Yumoto et al. | 455/456.6 |
| 2012/0072110 A1* | 3/2012 | Venkatraman | 701/434 |
| 2012/0290253 A1* | 11/2012 | Barrett et al. | 702/150 |
| 2013/0257650 A1* | 10/2013 | Miyake | 342/357.31 |

FOREIGN PATENT DOCUMENTS

JP  2011-257260  * 12/2011  .............. G01C 5/06
KR  10-2005-0040403 A  5/2005

OTHER PUBLICATIONS

English translation of JP 2011-257260, published on Dec. 2011.*
English translation of JP 2011-257260, published on Dec. 22, 2011.*

* cited by examiner

*Primary Examiner* — Huan Tran
(74) *Attorney, Agent, or Firm* — Jefferson IP Law, LLP (57) ABSTRACT

A method of measuring an altitude in a portable terminal is provided. The method includes receiving a reference altitude from an information providing device fixed and installed at a certain point, measuring a current atmospheric pressure of the certain point, calculating an altitude of the certain position using the measured current atmospheric pressure and a reference atmospheric pressure, and storing a difference between the reference altitude and the calculated altitude of the certain point as an altitude error.

20 Claims, 4 Drawing Sheets

METHOD AND APPARATUS FOR MEASURING ALTITUDE IN PORTABLE TERMINAL

PRIORITY

This application claims the benefit under 35 U.S.C. §119(a) of a Korean patent application filed on Jun. 5, 2012 in the Korean Intellectual Property Office and assigned Serial No. 10-2012-0060418, the entire disclosure of which is hereby incorporated by reference.

BACKGROUND OF THE INVENTION

1. Field of the Invention

The present invention relates to a method and apparatus for measuring an altitude. More particularly, the present invention relates to a method and apparatus for measuring an altitude of a portable terminal capable of improving accuracy at the time of measuring the altitude using a barometer.

2. Description of the Related Art

Along with the development of information communication technologies and semiconductor technologies, distribution and use of a portable terminal is on the rapid increase. The portable terminal provides various functions such as a calling function, a music replay function, a text message transmission and reception function, a digital broadcast reception function, a near field communication function, and an Internet connection function. Particularly, portable terminals having a function of measuring an altitude are increasing.

Some examples of methods of measuring the altitude are a method of using a property that atmospheric pressure changes as the altitude increases on the basis of the sea level, a method of triggering an electronic pulse from an airplane to a ground and calculating an altitude by measuring round-trip time of the triggered electronic pulse between the airplane and the ground, and a method of measuring an altitude of the current location by calculating a distance to the satellite by a difference between a reference time and a signal transmission time by receiving the signal triggered from a Global Positioning System (GPS) artificial satellite. However, the method of using the electronic pulse and the method of using GPS generally uses an expensive device that cannot be easily accessible. Further, the method of using the GPS has an error ranging from several meters up to tens of meters and thus is not reliable, and cannot receive the GPS signals inside a building. Hence, the portable terminal generally uses a method of measuring an altitude using an atmospheric pressure change according to the increase of the altitude.

The method of measuring the altitude using the atmospheric pressure change uses a principle that the atmospheric pressure gradually decreases as the altitude increases, and the altitude may be calculated using the measured atmospheric pressure and the reference atmospheric pressure (e.g., the sea level atmospheric pressure) by Equation 1 below.

$$z = cT \log(p_0/p) \quad \text{Equation 1}$$

Here, "z" denotes the current altitude, "$P_0$" denotes the reference atmospheric pressure (e.g., the sea level atmospheric pressure), "p" denotes the current atmospheric pressure, "c" denotes a constant, and "T" denotes the absolute temperature. For example, the portable terminal may calculate the current altitude based on the reference atmospheric pressure (e.g., sea level atmospheric pressure) and the current atmospheric pressure, under the assumption that the current temperature is a room temperature (e.g., 25° C.).

To this end, the related-art portable terminal stores the reference atmospheric pressure (e.g., sea level atmospheric pressure) in advance or permits a user to input the reference atmospheric pressure at the current location at the time of measurement. However, in the case in which the reference atmospheric pressure was registered in advance, the reference atmospheric pressure is changed according to the weather condition and temperature, etc., and thus the accurate altitude cannot be measured. In other words, the related-art method of measuring the altitude may have errors in the calculated altitude if the reference atmospheric pressure is not frequently updated because the reference atmospheric pressure is momentarily changed along with the change of time or weather.

Further, according to the related-art method of measuring the altitude, if the reference atmospheric pressure is input from the user, the user should always recognize the reference atmospheric pressure at the current location or should determine the reference atmospheric pressure from a website that provides the reference atmospheric pressure such as a weather center, etc. In particular, according to the related-art method of measuring the altitude, if the user does not know the reference atmospheric pressure at the current location, the altitude cannot be measured. Further, the reference atmospheric pressure provided by the weather center is the reference atmospheric pressure measured in a weather station closest to the current location. Hence, even if the reference atmospheric pressure is received through the weather center, the current altitude calculated by the above Equation 1 may have an error. For example, according to the related-art method of measuring the altitude of the portable terminal, the reference atmospheric pressure is changed according to the change of time and weather, and thus it is difficult to calculate the accurate altitude, and if the altitude is intended to be corrected by correcting the reference atmospheric pressure, it is inconvenient for the user to obtain and re-input the accurate reference atmospheric pressure.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method and apparatus for measuring an altitude of a portable terminal capable of more accurately measuring the altitude by correcting the altitude measured in the portable terminal by receiving the reference altitude from the altitude information providing device installed at a fixed point such as an entrance of a building or a starting point of a climbing route.

Another aspect of the present invention is to provide a method and apparatus for measuring an altitude of a portable terminal capable of providing various services that utilize the altitude information as it becomes possible to accurately measure the altitude.

In accordance with an aspect of the present invention, a method of measuring an altitude in a portable terminal is provided. The method includes receiving a reference altitude from an information providing device fixed and installed at a certain point, measuring a current atmospheric pressure of the certain point, calculating an altitude of the certain position using the measured current atmospheric pressure and a reference atmospheric pressure, and storing a difference between the reference altitude and the calculated altitude of the certain point as an altitude error.

In accordance with another aspect of the present invention, an apparatus for measuring an altitude of a portable terminal is provided. The apparatus includes a local wireless communication unit configured to receive a reference altitude from an information providing device fixed and installed at a certain point, an atmospheric pressure measurement unit configured to measure an atmospheric pressure, and a controller configured to calculate an altitude of the certain position using a current atmospheric pressure measured through the atmospheric pressure measurement unit and a reference atmospheric pressure, and to set a difference between the reference altitude and the calculated altitude of the certain point as an altitude error.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

Figure 1:
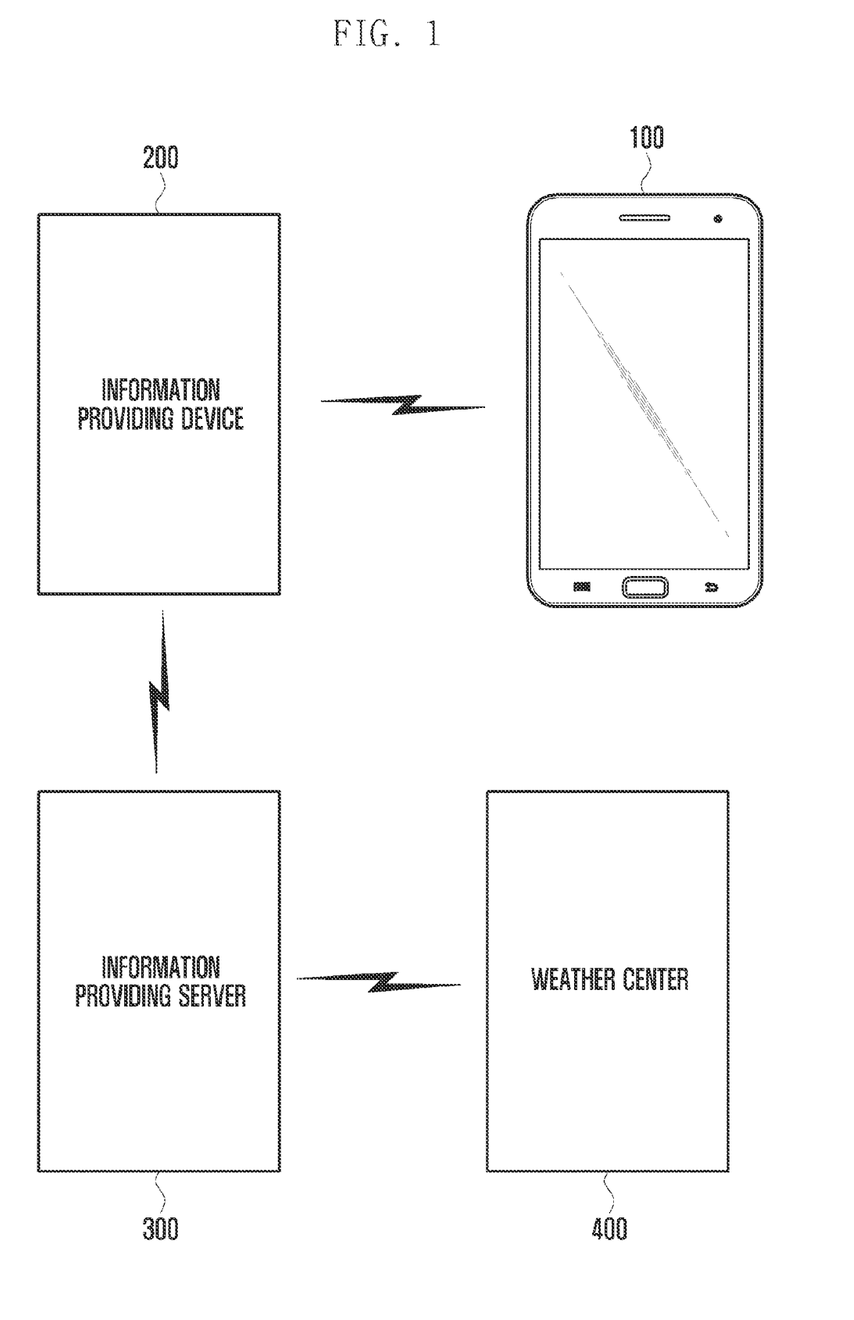
FIG. 1 schematically illustrates a system for measuring an altitude according to an exemplary embodiment of the present invention.

FIG. 1 schematically illustrates a system for measuring an altitude according to an exemplary embodiment of the present invention.

Referring to FIG. 1, an altitude measurement system according to an exemplary embodiment of the present invention may include a portable terminal 100, an information providing device 200, an information providing server 300 and a weather center 400.

The information providing device 200 provides a reference altitude. The information providing device 200 may provide the reference altitude to the portable terminal 100 through local wireless communication such as Radio Frequency IDentification (RFID) and Near Field Communication (NFC). Further, the information providing device 200 may transmit the reference altitude to the portable terminal 100 through a Quick Response code (QR code). The information providing device 200 may be fixed and installed at the entrance of a department store, a shopping mall, a hypermarket, a climbing route, etc. As the information providing device 200 is installed in the fixed location, the accurate reference altitude may be provided to the portable terminal 100. Further, the information providing device 200 may further provide additional information as well as the reference altitude to the portable terminal 100. The additional information may include the building name, the number of floors, shopping information for each floor, the altitude information for each floor, the purchase list for each floor, the map for each floor, weather information, climbing courses, etc. Further, if the size of the additional information is so large that it is difficult to transmit the information through the RFID, NFC or QR code, the information providing device 200 may provide the address of the information providing server 300 (e.g., a Uniform Resource Location (URL), an Internet protocol address, etc.) to receive additional information from the information providing server 300. At this time, in order to provide at least one of the reference altitude and additional information to the portable terminal 100 through the RFID, NFC and QR code, the information providing device 200 may store the reference altitude and additional information in the previously agreed information field area.

Further, the information providing device 200 according to another exemplary embodiment of the present invention may provide the address (URL or Internet Protocol (IP)) of a web server (e.g., the information providing server 300) for providing at least one of the reference altitude and additional information to the portable terminal 100.

The portable terminal 100 provides a function of measuring an altitude, and may be a mobile communication terminal, a smart phone, a Personal Digital Assistant (PDA), a tablet personal computer, etc. To this end, the portable terminal 100 may include an atmospheric measurement unit (not shown). The portable terminal 100 may calculate the current altitude by using the current atmospheric pressure measured through the atmospheric measurement unit and the pre-stored standard atmospheric pressure. In particular, the portable terminal 100 may receive the reference altitude provided from the information providing device 200, and may correct the current altitude. Specifically, the portable terminal 100 may set the difference between the reference altitude and the current altitude measured using the atmospheric measurement unit 140 as the altitude error, and may store the altitude error. Thereafter, the portable terminal 100 may periodically measure the altitude through the atmospheric pressure measurement unit 140, and may calculate the accurate actual altitude by adding the periodically measured current altitude and the altitude error. In this way, the altitude of the current location may be more accurately measured in comparison with the related art. Further, the portable terminal 100 may provide various services by utilizing the altitude information. For example, the portable terminal 100 may recognize a corresponding floor according to the altitude change of the portable terminal 100 in a department store, a shopping mall, a hypermarket, etc. having a plurality of floors, and may display a map corresponding to the recognized floor to the display unit 130. Further, the climbing route information, weather information, etc. are received from the information providing device 200 installed at the starting point of the climbing route, and the user's movement path and the remaining distance up to the summit, etc. may be accurately provided based on the climbing route information, which will be described later in detail with reference to FIG. 4.

The information providing device 200 according to another exemplary embodiment of the present invention may receive the current atmospheric pressure from the portable terminal 100 through the RFID or NFC, and may transmit the current atmospheric pressure and the information on the current location of the portable terminal 100 to the information providing server 300. Further, if the information providing server 300 stores in advance the location information of the information providing device 200, the information providing device 200 may transmit the current atmospheric pressure and the identification information for identifying the portable terminal 100 to the information providing server 300. At this time, the information providing server 300 may transmit the location information of the information providing device 200 to the weather center 400, and receive the reference atmospheric pressure transmitted from the weather center 400. The information providing server 300 may calculate the altitude of the location where the information providing device 200 has been installed using the reference atmospheric pressure transmitted from the weather center 400 and the current atmospheric pressure transmitted from the information providing device 200. Thereafter, the information providing device 200 may transmit the current altitude calculated by the information providing server 300 to the portable terminal 100. Further, the information providing server 300 may directly transmit the calculated current altitude to the portable terminal 100. Further, if the information providing server 300 knows the reference altitude of the point where the information providing device 200 has been installed, the information providing server 300 may acquire the altitude error by calculating the difference between the current altitude and the reference altitude, and may transmit the altitude error to the portable terminal 100 through the information providing device 200 or may directly transmit the altitude error to the portable terminal 100.

Further, if both the reference altitude and the additional information are able to be transmitted through the information providing device 200, the information providing server 300 and the weather center 400 may be omitted.

Until now, the altitude measurement system has been described. Hereinafter, in the altitude measurement system, a portable terminal will be described.

Figure 2:
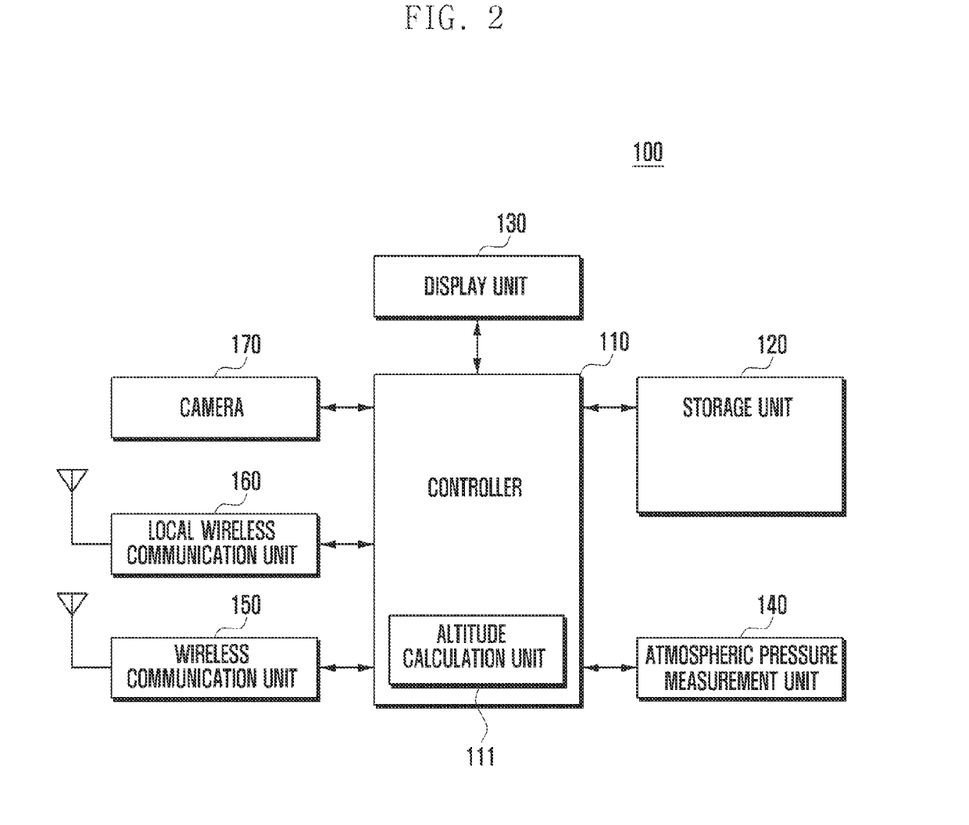
FIG. 2 is a block diagram schematically illustrating a configuration of a portable terminal according to an exemplary embodiment of the present invention.

FIG. 2 is a block diagram schematically illustrating a configuration of a portable terminal according to an exemplary embodiment of the present invention.

Referring to FIGS. 1 and 2, the portable terminal 100 according to an exemplary embodiment of the present invention may include a camera 170, a local wireless communication unit 160, a wireless communication unit 150, an atmospheric pressure measurement unit 140, a display unit 130, a storage unit 120 and a controller 110. The controller 110 may include an altitude calculation unit 111.

The camera 170 is a device for photographing a subject, and may convert the subject into an electrical image signal. The camera 170 may be formed in a Complementary Metal Oxide Semiconductor (CMOS) scheme or a Charge Coupled Device (CCD) scheme. The detailed description on the camera 170 is obvious to those skilled in the art, and thus the detailed description is omitted. In particular, when the information providing device 200 provides at least one of the reference altitude and the additional information through the QR code or provides the address (e.g., URL) of the information providing server 300 through the QR code, the camera 170 may photograph the QR code. For example, the camera 170 may photograph the QR code included in the sign (e.g., guide map) installed at the entrance of a building, a hypermarket, a department store, a shopping mall, a climbing route, etc. Further, if the reference altitude and the address of the information providing server 300 are provided in the form of a barcode, the camera 170 may photograph the barcode.

The local wireless communication unit 160 may provide the wireless communication function at short range (e.g., between several centimeters and several tens of meters). Such a local wireless communication unit 160 may be formed by an RFID module and an NFC module. For example, the local wireless communication unit 160 may receive the reference altitude and the additional information from the information providing device 200 through the RFID communication or the NFC communication. Further, the local wireless communication unit 160 may receive the address of the information providing server 300 through the RFID communication or the NFC communication. However, the present invention is not limited thereto. For example, the local wireless communication unit 160 may support various local communication technologies. For example, the local wireless communication unit 160 may support local wireless communication technologies such as the infrared communication, home RF, and Zigbee. Further, in order to calculate the altitude error or the current altitude, the local wireless communication unit 160 may transmit the current atmospheric pressure to the information providing server 300 through the information providing device 200, and may receive the current altitude or the altitude error calculated by the information providing server 300 through the information providing device 200.

The wireless communication unit 150 may form the voice communication channel for a call (e.g., a voice call and a video call) with a base station, and a data communication channel for data transmission. To this end, the wireless communication unit 150 may include a wireless frequency transmission unit (not shown) for up-converting and amplifying the frequency of the transmitted signal, a wireless frequency reception unit (not shown) for low-noise amplifying the received signal and down-converting the frequency, and a transmission and reception separation unit (not shown) for separating the received signal and the transmitted signal. If the information providing device 200 provides only the address of the information providing server 300, the wireless communication unit 150 may request connection to the information providing server 300 under the control of the controller 110, and may receive the additional information and the reference altitude from the information providing server 300. Further, the wireless communication unit 150 may receive the reference atmospheric pressure (e.g., sea level atmospheric pressure) to measure the current altitude using the current atmospheric pressure measured through the atmospheric pressure measurement unit 140. For example, the wireless communication unit 150 may receive the reference atmospheric pressure from the weather center 400. Further, if the information providing server 300 calculates the altitude and the altitude error, the wireless communication unit 150 may receive, from the information providing server 300, the current altitude or the altitude error calculated by the information providing server 300.

The atmospheric pressure measurement unit 140 may measure the atmospheric pressure. The atmospheric pressure measurement unit 140 may be a barometer. The barometer may be a mercury barometer, an aneroid barometer or a magnetic barometer, etc. In particular, the atmospheric pressure measurement unit 140 may be implemented as a barometer (e.g., an aneroid barometer) that may be implemented in a small size such that the barometer may be mounted inside the portable terminal 100. When the reference altitude is received from the information providing device 200, the atmospheric pressure measurement unit 140 may be activated, measure the atmospheric pressure continually or periodically, and transmit the measured atmospheric pressure to the altitude calculation unit 111 of the controller 110. The atmospheric pressure measurement unit 140 is weak in calculating the absolute altitude, but can accurately measure the relative altitude difference in an environment (e.g., inside a building) in which the temperature difference is not significant. For example, the absolute altitude of the current location may not be accurately measured through the atmospheric pressure measurement unit 140, but it is possible to accurately measure how much the altitude of the current location has been relatively changed in comparison with the altitude of the previous reference location. Hence, if the initial altitude value is accurate, the altitude measured through the atmospheric pressure measurement unit 140 is also accurate. Likewise, the relative altitude change may be measured through the atmospheric pressure measurement unit 140, and thus the portable terminal 100 may accurately recognize the inter-floor movement if the portable terminal 100 knows the inter-floor altitude difference.

The display unit 130 displays information input by a user or information provided to the user as well as various menus of the portable terminal 100. For example, the display unit 130 may provide various screens according to the use of the portable terminal 100, such as a home screen, a menu screen, a message writing screen, a calling screen, a schedule management screen, an address list screen, a webpage output screen, etc. In particular, the display unit 130 may display a screen (e.g., a building map screen, a climbing route guide screen, etc.) corresponding to additional information when receiving the additional information. Further, if the altitude error is not valid, the display unit 130 may display a message requesting the update of the altitude error while reporting that the altitude error is not valid. The display unit 130 may be formed as a Liquid Crystal Display (LCD), an Organic Light Emitted Diode (OLED), an Active Matrix Organic Light Emitted Diode (AMOLED), etc. Further, if the display unit 130 is formed in the form of a touch screen, the display unit 130 may operate as an input unit (not shown).

The storage unit 120 may store user data and data transmitted and received during communication as well as an operating system of the portable terminal 100, and application programs used for other optional functions such as a sound replay function, an image or a moving picture replay function, and a broadcast replay function. For example, the storage unit 120 may store a moving picture file, a game file, a music file and a movie file, etc. In particular, the storage unit 120 may store an equation for calculating the current altitude using the current atmospheric pressure measured through the atmospheric pressure measurement unit 140 and the reference atmospheric pressure that has been stored before or is input by a user. The equation has been described in the above description of the related art, and thus the description will omitted here. Further, the storage unit 120 may store an application program for calculating the altitude. The altitude calculation application program may calculate the difference between the current altitude calculated by the stored equation and the reference altitude received from the information providing device 200. The calculated difference may be set as an altitude error for correcting the altitude measured through the atmospheric pressure measurement unit 140. If the altitude error is set, the altitude calculation application program may calculate the corrected current altitude by adding the current altitude calculated by the equation to the altitude error. For example, the altitude error may be calculated using the reference altitude at the fixed point, and may calculate the accurate current altitude by correcting the current altitude measured through the atmospheric pressure measurement unit 140. Further, if the portable terminal 100 knows the reference altitude and the current altitude, the altitude calculation application program may calculate the reference atmospheric pressure by applying the equation.

Further, the altitude calculation application program may correct the altitude by using the inter-floor altitude difference included in the additional information. In detail, assuming that the inter-floor altitude difference is 3 m and the reference altitude of the first floor is 100 m, when the user moves to the second floor, the altitude calculation application program may calculate the current altitude (103 m) by adding the reference altitude (100 m) to the inter-floor altitude difference (3 m). At this time, if the altitude is different from the current altitude (e.g., 102.9 m) corrected using the altitude difference, the altitude calculation application program may put priority on the inter-floor altitude difference included in the additional information and may determine the current altitude as 103 m. Further, the storage unit 120 may decode the data received through the NFC, RFID, QR code, etc., and store an application for extracting the reference altitude, additional information, URL, IP address, etc.

Further, the storage unit 120 may store the storing time of the altitude error together with the storing location of the altitude error, so that it may determine the validity of the altitude error. For example, if time is elapsed for more than a certain time from the time when the altitude error is stored, or the location is deviated from the location where the altitude error is stored by more than a certain distance, the portable terminal 100 may determine that the altitude error is not valid. Further, if the altitude error is updated or the altitude error is determined as invalid, the storage unit 120 may delete the previous altitude error under the control of the controller 110. Further, the storage unit 120 may store the received additional information.

The controller 110 may control the overall operation of the portable terminal 100 and a signal flow between internal blocks of the portable terminal 100, and may perform a function of processing data. In particular, the controller 110 may include an altitude calculation unit 111. The altitude calculation unit 111 may calculate the current altitude of the portable terminal 100. Specifically, the altitude calculation unit 111 may calculate the current altitude using the reference atmospheric pressure (sea level atmospheric pressure) and the current atmospheric pressure measured through the atmospheric pressure measurement unit 140. Thereafter, the altitude calculation unit 111 may calculate the difference between the reference altitude and the calculated current altitude, and set the calculated difference as the altitude error and store the altitude error in the storage unit 120. If the altitude error is set, the altitude calculation unit 111 may correct the current altitude by adding the calculated current altitude to the altitude error. At this time, the altitude calculation unit 111 may determine the validity of the altitude error. For example, the altitude calculation unit 111 may determine the validity of the altitude error using at least one of the time when the altitude error is stored and the information of the location where the altitude error is stored. If the altitude error is valid, the altitude calculation unit 111 may correct the current altitude as the value generated by adding the calculated current altitude to the altitude error, and if the altitude error is not valid, the altitude calculated by the equation may be set as the current altitude. At this time, the controller 110 may control the message requesting the update of the altitude error to be output on the display unit 130. Further, the altitude calculation unit 111 may provide the current location information to a server, such as the weather center 400, which provides the reference atmospheric pressure and may receive the reference atmospheric pressure of the current location for more accurate altitude calculation.

The altitude calculation unit 111 may correct the current altitude using the inter-floor altitude difference included in the additional information. Specifically, when it is assumed that the inter-floor altitude difference is 3 m and the reference altitude of the first floor is 100 m, if the user moves from the first floor to the second floor, the altitude calculation unit 111 may calculate the current altitude (103 m) by adding the reference altitude (100 m) to the inter-floor altitude difference (3 m). At this time, if the altitude is different from the current altitude (e.g., 102.9 m) corrected using the altitude error, the altitude calculation unit 111 may put priority on the inter-floor altitude difference included in the additional information, and may determine the current altitude as 103 m.

Further, the controller 110 may control the provision of various services utilizing the altitude information. For example, the controller 110 may recognize a corresponding floor according to the altitude change of the portable terminal 100 in a department store, shopping mall, hypermarket, etc. having a plurality of floors, and may display a map corresponding to the recognized floor to the display unit 130. Further, the controller 110 may receive additional information including climbing route information from the information providing device 200 installed in the entrance of the climbing route, and may accurately provide the user's movement path and the remaining distance up to the summit based on the climbing route information, which will be described later in detail with reference to FIG. 4.

Further, though not illustrated in FIG. 2, the portable terminal 100 may selectively further include elements having additional functions, such as a Global Positioning System (GPS) module for reception of location information, a broadcast reception module for broadcast reception, a digital sound source replay module such as a digital audio module, an Internet communication module for performing an Internet function, and a motion sensor module for sensing movements of the portable terminal 100. The elements may be variously modified by the convergence trend of digital devices, and thus not all such elements may be listed here, but, the portable terminal 100 may further include elements of the same level as that of the above mentioned elements.

Figure 3:
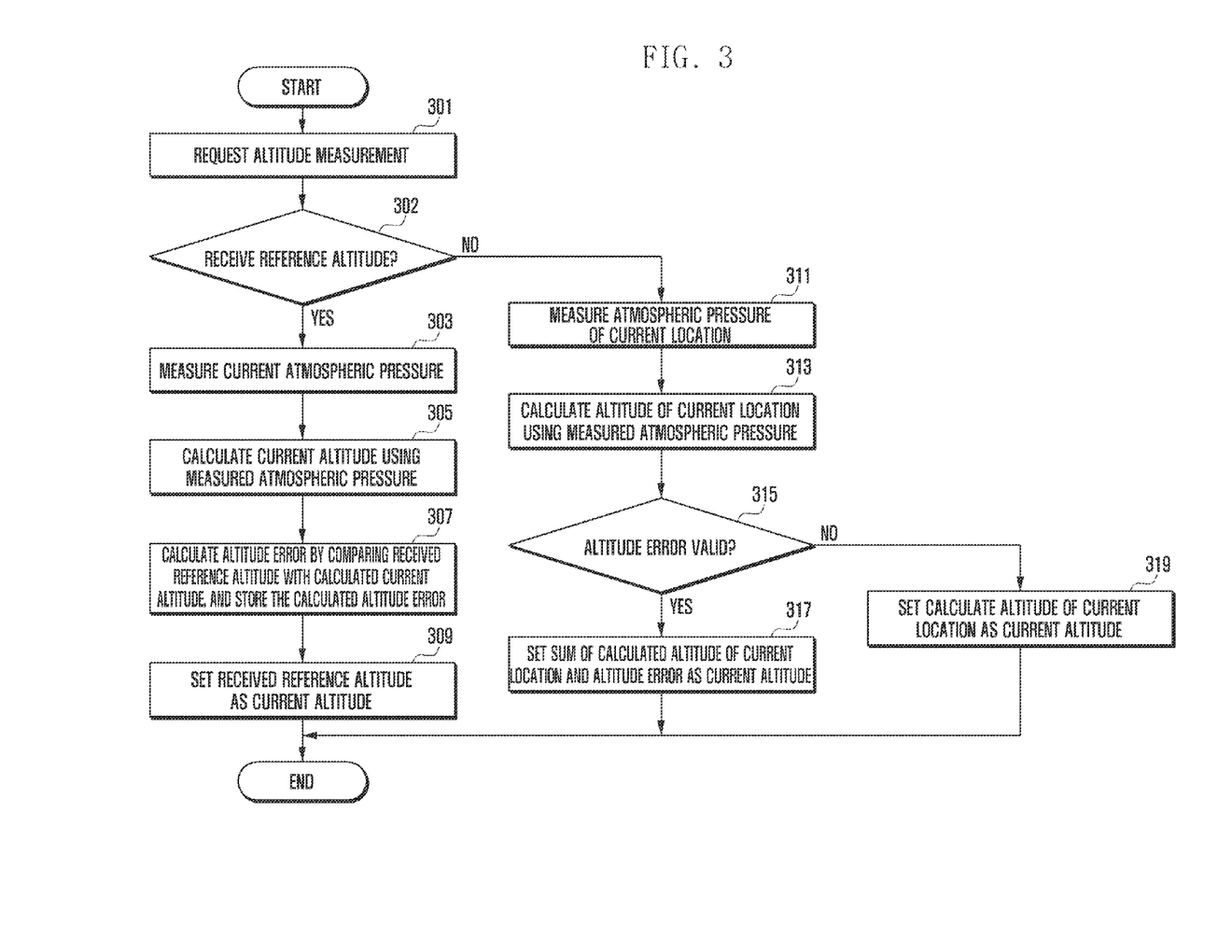
FIG. 3 is a flowchart illustrating a method of measuring an altitude of a portable terminal according to an exemplary embodiment of the present invention.

FIG. 3 is a flowchart illustrating a method of measuring an altitude of a portable terminal according to an exemplary embodiment of the present invention.

Referring to FIGS. 1 to 3, the controller 110 of the portable terminal 100 may sense the altitude measurement request in step 301. If the altitude measurement request is sensed, the controller 110 may determine whether the reference altitude is received in step 302. The reference altitude may be received through a local wireless communication channel such as an RFID, NFC, etc., or may be received by photographing the QR code, barcode, etc. using a camera 170. At this time, a protocol is defined which shows where and how the reference altitude is stored to receive the reference altitude through one of the RFID, NFC and QR code. Likewise, the technology of transmitting and receiving the information through the RFID, NFC and QR code is obvious to those skilled in the art, and thus the detailed description will be omitted herein. The altitude information providing device 200 may be installed at a fixed point such as an entrance of a building such as a department store, hypermarket or apartment house, or an entrance of a climbing route.

If the reference altitude is received, the controller 110 may measure the current atmospheric pressure using the atmospheric pressure measurement unit 140 in step 303. Thereafter, the altitude calculation unit 111 of the controller 110 may calculate the current altitude using the measured current atmospheric pressure in step 305. The altitude calculation unit 111 may calculate the current altitude through the predefined equation.

The controller 110 may calculate the altitude error by comparing the received reference altitude with the calculated current altitude, and store the calculated altitude error in step 307. Further, the controller 110 may set the reference altitude received at step 301 as the current altitude in step 309. This is because that the information providing device 200 for providing the reference altitude is installed at the fixed location, and thus the altitude is not changed and the accurate value can be acquired.

Further, if the reference altitude is not received at step 302, the controller 110 may measure the atmospheric pressure of the current location using the atmospheric pressure measurement unit 140 in step 311, and may calculate the altitude of the current location using the atmospheric pressure of the measured current location in step 313. If the calculation of the altitude is completed, the controller 110 may determine whether the previously stored altitude error is valid in step 315. The validity of the altitude error may be determined based on time. For example, if a preset time is elapsed from a time when the altitude error is stored, the controller 110 may determine that the altitude error is not valid. Further, the controller 110 may compare the location information containing the altitude error with the current location information, and if the difference is greater than a preset distance, it is determined that the altitude error is invalid. Further, the controller 110 may determine the validity of the altitude error considering all of the time when and location where the altitude error is stored. Further, if the altitude error is updated or it is determined that the altitude error is invalid, the controller 110 may delete the invalid altitude error.

If it is determined that the altitude error is valid at step 315, the controller 110 may set the sum of the altitude of the current location calculated at step 313 and the altitude error as the current altitude in step 317. On the other hand, if it is determined that the altitude error is invalid at step 315, the controller 110 may set the altitude of the current location calculated at step 313 as the current altitude in step 319.

Further, in the above, it was described that the reference altitude information is transmitted to the portable terminal 100 through the RFID, NFC, QR code, etc., but the present invention is not limited thereto. For example, in another exemplary embodiment of the present invention, only the address (e.g., URL information) of the website that provides the reference altitude information is provided through the RFID, NFC, QR code, etc., and the portable terminal 100 may connect to the website through the address received from the information providing device 200, and may then receive the reference altitude information from the website.

Further, when approaching the information providing device 200 including the RFID or NFC, the portable terminal 100 may transmit the current atmospheric pressure information measured by the atmospheric pressure measurement unit 140 to the information providing device 200. At this time, the information providing device 200 may transmit the received current atmospheric pressure information and the installation location information of the information providing device 200 to the information providing server 300. The information providing server 300 may transmit the installation location information of the information providing device 200 to the weather center 400 providing the reference atmospheric pressure, and may receive the reference atmospheric pressure of the location where the information providing device 200 is installed from the weather center 400. Thereafter, the information providing server 300 may calculate the altitude based on the received current atmospheric pressure information and the reference atmospheric pressure of a corresponding region, and may transmit the calculated altitude to the information providing device 200. Thereafter, the portable terminal 100 may receive the current altitude through the information providing device 200 or the information providing server 300. Further, if the information providing server 300 knows the reference altitude of the point where the information providing device 200 is installed, the information providing server 300 may calculate the altitude error, and may transmit the altitude error through the information providing device 200 or the information providing server 300 to the portable terminal 100.

Further, it was described that the portable terminal 100 receives only the reference altitude information, but it is possible to receive various additional information (e.g., building information, information of each floor of a building, shopping information, the sale list for each floor, the altitude for each floor, an inter-floor altitude difference, sightseeing information, and mountain information such as the climbing route) in addition to the reference altitude information. Likewise, the additional information that uses a lot of data may be received through the wireless communication unit 150 as described above.

Further, only a method of correcting the current altitude using the altitude error was described above, but the present invention is not limited thereto. For example, the altitude calculation unit 111 of the controller 110 may correct the current altitude using the inter-floor altitude difference included in the additional information. Specifically, when it is assumed that the inter-floor altitude difference is 3 m and the reference altitude of the first floor is 100 m, the altitude calculation unit 111 of the controller 110 may calculate the current altitude (103 m) by adding the reference altitude (100 m) to the inter-floor altitude difference (3 m). At this time, if the current altitude (103 m) calculated using the inter-floor altitude difference is different from the current altitude (e.g., 102.9 m) calculated using the altitude error, the altitude calculation unit 111 may put priority on the inter-floor altitude difference, and may determine 103 m as the current altitude.

Further, the altitude calculation unit 111 of the controller 110 may calculate the current altitude using the altitude variation measured through the reference altitude and the atmospheric pressure measurement unit 140. Specifically, the altitude calculation unit 111 may measure the altitude variation based on the altitude at the time point when the reference altitude is received, and may calculate the current altitude by adding the reference altitude to the altitude variation. For example, in a state in which the reference altitude is 100 m and the altitude measured through the atmospheric pressure measurement unit 140 at the time point when the reference altitude is received is 103 m, if the portable terminal 100 is moved to a place where the altitude measured through the atmospheric pressure measurement unit 140 is 110 m, the altitude calculation unit 111 may determine 107 m as the current altitude by adding the reference altitude (100 m) to the altitude variation (7 m=110−103).

The method of measuring the altitude according to an exemplary embodiment of the present invention was described in the above. Hereinafter, a method of utilizing altitude information of a portable terminal will be described.

Figure 4:
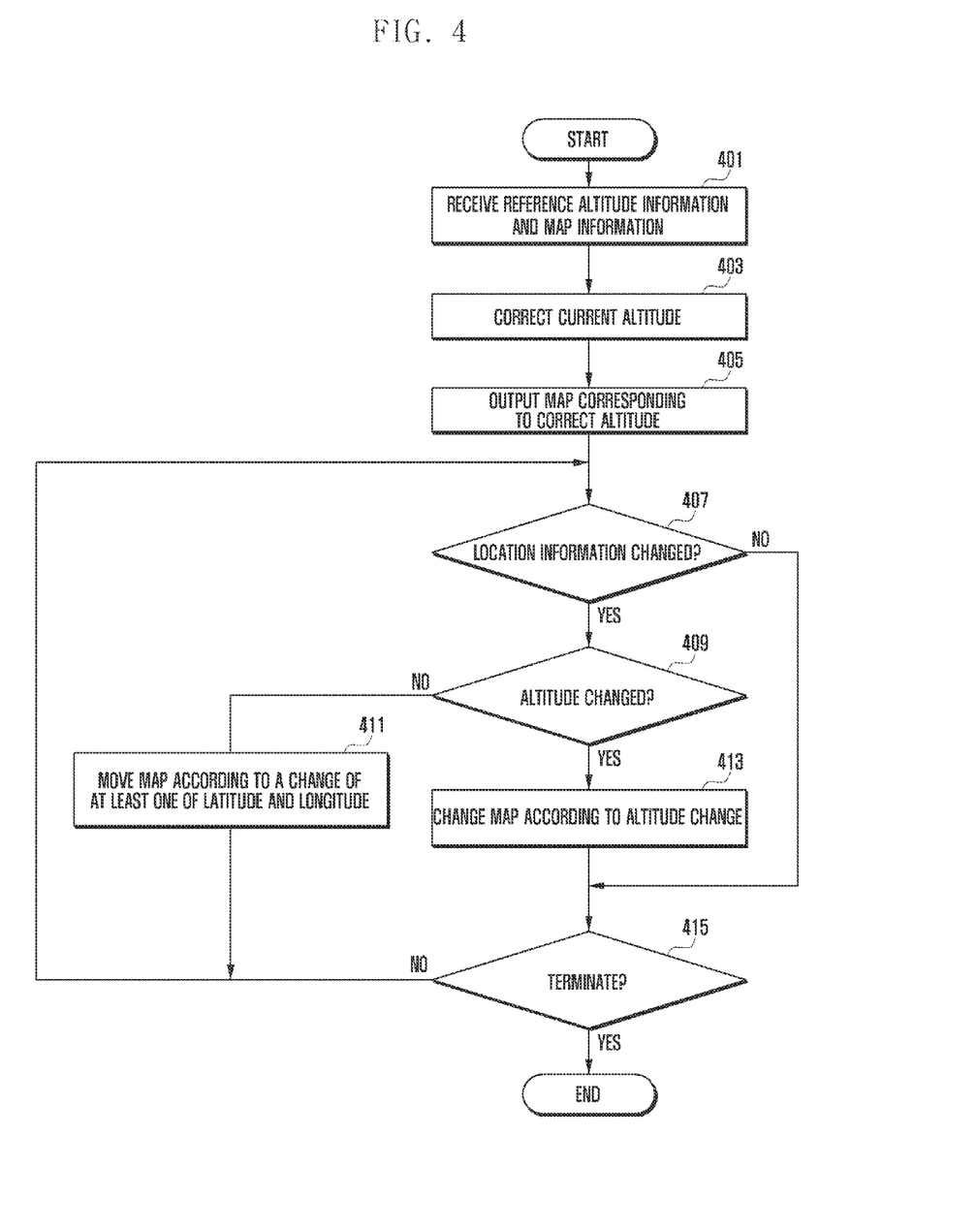
FIG. 4 is a flowchart illustrating a method of utilizing altitude information of a portable terminal according to an exemplary embodiment of the present invention.

FIG. 4 is a flowchart illustrating a method of utilizing altitude information of a portable terminal according to an exemplary embodiment of the present invention.

Referring to FIGS. 1 to 4, the controller 110 of the portable terminal 100 may receive the reference altitude information and the map information in step 401. The reference altitude information and the map information may be received from the information providing device 200 installed at the entrance of a department store, a shopping mall, a hypermarket, a climbing route, etc. At this time, as described above, the reference altitude information and map information may be received from the web server corresponding to the web address transmitted from the information providing device 200.

If the reference altitude information and map information are received, the controller 110 may correct the current altitude in step 403. Here, the method of correcting the current altitude was described above with reference to FIG. 3, and thus the detailed description will be omitted here.

The controller 110 may output a map corresponding to the corrected altitude in step 405. For example, if the information providing device 200 is positioned on the first floor of a building having ten floors, the portable terminal 100 may output a map corresponding to the first floor. At this time, if a location providing service (e.g., a navigation function) is provided, the location of the portable terminal 100 may be displayed on the output map. At this time, a GPS signal is not generally received indoors, and thus the portable terminal 100 may provide a navigation service through dead reckoning. The dead reckoning is a technology used to determine the location by measuring the moving time, moving direction and moving speed. In particular, Pedestrian Dead Reckoning (PDR) developed for a pedestrian may be employed. In order to provide the dead reckoning, the portable terminal 100 may include at least one sensor (e.g., an acceleration sensor, a gyro sensor, a motion sensor, etc.) for measuring the moving time, moving speed and moving direction.

The controller 110 may determine whether a location information change (latitude, longitude, and altitude) occurs in step 407. If location information change has not occurred, the process may proceed to step 415 by the controller 110. On the other hand, if a change of the location information occurs, the controller 110 may determine whether an altitude change occurs in step 409. At this time, the criterion value for determining the change of altitude may be a floor height (e.g., inter-floor altitude change) of a corresponding building. The criterion value may be calculated by dividing the height information of the entire building by the number of floors of the building. Further, the criterion value may be also received at step 401. For example, the controller 110 may control to receive and store the altitude of each floor, determine the floor by comparing the current altitude with the received altitude of each floor, and display the map of a corresponding floor.

If the altitude change is not sensed, for example, if at least one of the latitude and the longitude is changed, the controller 110 may move the map according to the change of at least one of the latitude and the longitude in step 411. Thereafter, the controller 110 may return to step 407. Further, step 411 may be omitted if the portable terminal 100 does not provide a navigation function according to the change of the latitude and the longitude inside a building and provides only the function of changing the map according to the altitude change.

Further, if an altitude change is sensed at step 409, the controller 110 may change the map according to the altitude change by proceeding to step 413. For example, if it is determined that the portable terminal 100 is moved to the second floor, the controller 110 may output the map corresponding to the second floor of the building on the display unit 130.

The controller 110 may determine whether a termination signal is input in step 415. For example, the termination signal may be generated when a key signal such as a cancellation key is input or the portable terminal 100 leaves the building. If the termination signal is not input, the controller 110 may repeatedly perform the above described steps by proceeding to step 407. On the other hand, if the termination signal is input, the controller 110 may terminate the map output and operate in a standby mode.

Until now, only an example of changing the map according to the altitude change was described. However, the present invention is not limited thereto. As another example of the present invention, an NFC device for providing the reference altitude and the additional information may be installed at the entrance of a large shopping mall having a plurality of floors, a portable terminal approaches the NFC device at the time of a user's entrance to the shopping mall, and the portable terminal receives the reference altitude information and the additional information (e.g., building name, latitude and longitude information, building size, the number of floors, the sale product list for each floor) about the shopping mall. Thereafter, the portable terminal may recognize the user's movement by floors through the altitude change, and display the shopping information (e.g., sale product list, discounted products, etc.) of the floor where the user is located.

Further, when a user climbs a mountain, the reference altitude, weather information, climbing course information, etc. may be received by photographing the QR code of the sign placed at the entrance of the climbing route. Thereafter, the portable terminal may display the user's accurate location based on the climbing course information according to the altitude change, and may display the remaining distance up to the summit on the map.

Further, when the user enters a hypermarket having a plurality of floors, the portable terminal may automatically receive the reference altitude and the additional information (e.g., sale product list for each floor, product display location information, etc.) for the hypermarket through the RFID device installed at the entrance of the hypermarket. At this time, if the user stores the purchase list in the portable terminal, the portable terminal may compare the sale product list for each floor with the user's purchase list, and display the purchasable list of a floor where the portable terminal is located. Further, the portable terminal may display the user's minimum path based on the purchasable list and the product display position. Further, the portable terminal may update the map and the purchasable list according to the floor movement.

The foregoing method for measuring an altitude of a portable terminal may be implemented in an executable program command form by various computer means and be recorded in a non-transitory computer readable recording medium. In this case, the non-transitory computer readable recording medium may include a program command, a data file, and a data structure individually or a combination thereof. In the meantime, the program command recorded in the non-transitory computer recording medium may be specially designed or configured for the present invention or be known to a person having ordinary skill in a computer software field to be used. The non-transitory computer readable recording medium includes Magnetic Media such as hard disk, floppy disk, or magnetic tape, Optical Media such as Compact Disc Read Only Memory (CD-ROM) or Digital Versatile Disc (DVD), Magneto-Optical Media such as floptical disk, and a hardware device such as Read Only Memory (ROM), Random Access Memory (RAM), flash memory storing and executing program commands. Further, the program command includes a machine language code created by a complier and a high-level language code executable by a computer using an interpreter. The foregoing hardware device may be configured to be operated as at least one software module to perform an operation of the present invention.

As described above, a method and apparatus for measuring an altitude of a portable terminal according to an exemplary embodiment of the present invention may provide accurate altitude information regardless of environmental factors as the altitude measured in the portable terminal is corrected by acquiring the reference altitude information from the fixed point through an information providing device such as RFID, NFC and QR. Likewise, in the present invention, the initial altitude value is accurately set, and thus the altitude measured thereafter using the altitude measurement unit is also accurate. Hence, an accurate altitude may be provided. In particular, as the altitude information is provided through the barometer, the accurate altitude information may be provided even in an indoor environment. As such, services may be provided by utilizing the altitude information. For example, an NFC device for providing the reference altitude is installed in front of the entrance of a large shopping mall and a user places the portable terminal close to the NFC device at the time of entering the shopping mall so that the reference altitude information and information on the shopping mall (e.g., the building name, latitude and longitude information, building size, the number of floors, the category for each floor) may be received. Thereafter, the portable terminal may recognize the user's movement by floors through the altitude change, and display the shopping information of the floor. Further, when climbing a mountain, the user may receive the reference altitude information, weather information, climbing course information, etc. by photographing the QR code of a sign placed at the starting point of the climbing route. Thereafter, the portable terminal may display the user's accurate position based on the climbing course information according to the altitude change, and may display the remaining distance up to the summit on the map. Further, when the user enters a hypermarket, the portable terminal may automatically receive the reference altitude and mart information through the RFID. At this time, if the user stores the purchase list in the portable terminal, the portable terminal may compare the purchase list for each floor of the hypermarket, display the list of items purchasable on the floor, and update the list of purchasable items according to the floor movement.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of measuring an altitude in a portable terminal, the method comprising:
    receiving a reference altitude from an information providing device fixed and installed at a certain point;
    measuring a current atmospheric pressure of a current location;
    calculating an altitude of the current location using the measured current atmospheric pressure and a reference atmospheric pressure; and
    storing a difference between the reference altitude and an altitude obtained by the calculating of the altitude of the current location as an altitude error.

2. The method of claim 1, further comprising:
    adding an altitude of the current location calculated according to a movement of the portable terminal to the altitude error; and
    correcting the altitude obtained by the calculating of the altitude of the current location.

3. The method of claim 2, wherein the correcting of the altitude obtained by the calculating of the altitude of the current location includes:
    determining validity of the altitude error;
    correcting the altitude obtained by the calculating of the altitude of the current location if the altitude error is valid; and
    removing the altitude error if the altitude error is not valid.

4. The method of claim 3, wherein the determining of the validity of the altitude error includes at least one of:
    determining whether a preset time is elapsed from a time point when the altitude error is stored; and
    determining whether the portable terminal is deviated from a position where the altitude error is stored by more than a preset distance.

5. The method of claim 2, further comprising:
    receiving additional information for the certain point.

6. The method of claim 5, further comprising:
    extracting an altitude of a moved floor from altitude information for each floor included in the additional information when a floor movement is sensed;
    comparing whether the extracted altitude of the moved floor coincides with the corrected altitude of the current location; and
    re-correcting the corrected altitude of the current location as the extracted altitude of the moved floor if the extracted altitude of the moved floor does not coincide with the corrected altitude of the current location.

7. The method of claim 1, wherein the receiving of the reference altitude includes one of:
    receiving the reference altitude through a Radio Frequency IDentification (RFID) communication;
    receiving the reference altitude through a Near Field Communication (NFC); and
    receiving the reference altitude through photographing a Quick Response (QR) code.

8. The method of claim 1, wherein the receiving of the reference altitude includes:
    receiving an address of a web server for providing the reference altitude through one of a Radio Frequency IDentification (RFID) communication, a Near Field Communication (NFC) communication and a Quick Response (QR) code photography; and
    receiving the reference altitude from the web server by connecting to the web server.

9. The method of claim 1, wherein the reference altitude is extracted from a previously agreed information field area based on a Radio Frequency IDentification (RFID) communication standard, a Near Field Communication (NFC) communication standard and a Quick Response (QR) code communication standard.

10. An apparatus for measuring an altitude of a portable terminal, the apparatus comprising:
    a local wireless communication unit configured to receive a reference altitude from an information providing device fixed and installed at a certain point;
    an atmospheric pressure measurement unit configured to measure an atmospheric pressure of a current location; and
    a controller configured to calculate an altitude of the current location using a current atmospheric pressure measured through the atmospheric pressure measurement unit and a reference atmospheric pressure, and to set a difference between the reference altitude and an altitude obtained by the calculating of the altitude of the current location as an altitude error.

11. The apparatus of claim 10, further comprising:
    a camera for photographing a Quick Response (QR) code for providing the reference altitude.

12. The apparatus of claim 10, wherein the controller is configured to add an altitude of a current location calculated according to a movement of the portable terminal to the altitude error, and to correct the calculated altitude of the current position.

13. The apparatus of claim 12, wherein, when correcting the altitude obtained by the calculating of the altitude of the current location, the controller is configured to determine validity of the altitude error, and to correct the altitude obtained by the calculating of the altitude of the current location if the altitude error is valid and removes the altitude error if the altitude error is not valid.

14. The apparatus of claim 13, wherein the controller is configured to determine that the altitude error is not valid if one of a preset time is elapsed from a time point when the altitude error is stored and the portable terminal is deviated from a position where the altitude error is stored by more than a preset distance.

15. The apparatus of claim 13, further comprising:
    a display unit configured to indicate that the altitude error is not valid if the altitude error is not valid, and to display a message to request an update of the altitude error.

16. The apparatus of claim 11, further comprising:
    a wireless communication unit configured to connect to a web server for proving the reference altitude received through the local wireless communication unit or photographed by the camera, using an address of the web server, and to receive the reference altitude from the web server.

17. The apparatus of claim 10, wherein the local wireless communication unit is one of a Radio Frequency IDentification (RFID) communication module and a Near Field Communication (NFC) module.

18. The apparatus of claim 10, wherein the local wireless communication unit or the wireless communication unit further receives additional information for the certain point.

19. The apparatus of claim 18, wherein the controller is configured to extract an altitude of a moved floor from altitude information for each floor included in the additional information when a floor movement is sensed, to compare whether the extracted altitude of the moved floor coincides with the corrected altitude of the current location, and to re-correct the corrected altitude of the current location as the extracted altitude of the moved floor if the extracted altitude of the moved floor does not coincide with the corrected altitude of the current location.

20. The apparatus of claim 10, wherein the reference altitude is stored in a previously agreed information field area based on a Radio Frequency IDentification (RFID) communication standard, a Near Field Communication (NFC) communication standard and a Quick Response (QR) code communication standard.

* * * * *